(12) United States Patent
Arai et al.

(10) Patent No.: US 8,085,645 B2
(45) Date of Patent: Dec. 27, 2011

(54) OPTICAL PICKUP DEVICE AND OPTICAL DISK APPARATUS

(75) Inventors: Akihiro Arai, Fukuoka (JP); Syougo Horinouchi, Fukuoka (JP); Hiroshi Shibata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 51 days.

(21) Appl. No.: 12/724,060

(22) Filed: Mar. 15, 2010

(65) Prior Publication Data
US 2010/0232283 A1 Sep. 16, 2010

(30) Foreign Application Priority Data

Mar. 13, 2009 (JP) ................................. 2009-060517
May 28, 2009 (JP) ................................. 2009-128473

(51) Int. Cl.
*G11B 7/00* (2006.01)

(52) U.S. Cl. ............................. 369/112.02; 369/112.08

(58) Field of Classification Search ............ 369/112.02, 369/112.05–112.07, 112.28, 112.29, 112.09, 369/112.14, 44.23
See application file for complete search history.

(56) References Cited

U.S. PATENT DOCUMENTS

| | | | | |
|---|---|---|---|---|
| 6,404,709 B1* | 6/2002 | Kouno | ...................... | 369/44.23 |
| 2001/0043522 A1* | 11/2001 | Park | ........................ | 369/44.23 |
| 2002/0122377 A1* | 9/2002 | De Vries et al. | ......... | 369/112.28 |
| 2002/0181366 A1* | 12/2002 | Katayama | .................... | 369/53.2 |
| 2006/0092816 A1* | 5/2006 | Kimura | ..................... | 369/112.08 |
| 2006/0239170 A1* | 10/2006 | Hashimoto | ............. | 369/112.03 |
| 2006/0262702 A1* | 11/2006 | Ide et al. | .................. | 369/112.01 |
| 2006/0274631 A1* | 12/2006 | Yoo et al. | ................. | 369/112.1 |
| 2007/0013984 A1* | 1/2007 | Kim et al. | ....................... | 359/11 |
| 2008/0239925 A1* | 10/2008 | Kuiper et al. | ............ | 369/112.02 |
| 2008/0285419 A1* | 11/2008 | Bae et al. | ..................... | 369/103 |
| 2009/0052302 A1* | 2/2009 | Yanagawa et al. | ........ | 369/109.01 |

FOREIGN PATENT DOCUMENTS

| | | |
|---|---|---|
| JP | 2003-085811 | 3/2003 |
| JP | 2005-353250 | 12/2005 |
| JP | 2006-060082 | 3/2006 |

* cited by examiner

*Primary Examiner* — Thang Tran
(74) *Attorney, Agent, or Firm* — Dickinson Wright PLLC (57) ABSTRACT

An optical pickup device includes a first laser element that emits first laser light, a second laser element that emits second laser light of which the wavelength is longer than that of the first laser light, an optical path composition element that composes the first laser light and the second laser light to one optical path, a wavelength selective element that acts on the composed first or second laser light; and an objective lens that condenses the first laser light and the second laser light on an optical disk. The magnitude of the power of the wavelength selective element as a lens with respect to the second laser light is larger than the magnitude of the power of the wavelength selective element as a lens with respect to the first laser light. Accordingly, it may be possible to reduce the optical pickup device and the optical disk apparatus in size.

10 Claims, 6 Drawing Sheets

OPTICAL PICKUP DEVICE AND OPTICAL DISK APPARATUS

BACKGROUND

1. Field of the Invention

The present invention relates to an optical pickup device and an optical disk apparatus that perform at least one of the recording or reproduction of information on an optical disk.

2. Description of the Related Art

An optical pickup device in the related art had the following structure.

That is, the optical pickup device includes a first laser element that emits first laser light, a second laser element that emits second laser light of which the wavelength is longer than that of the first laser light, an optical path composition element that composes the first laser light and the second laser light to one optical path, and an objective lens that condenses the first laser light and the second laser light on an optical disk. Further, the optical pickup device includes parallel plates as light-emitting position adjustment elements that are disposed between an optical path composition element and the first or second laser element and adjust the light-emitting positions of the first and second laser elements, which are seen from the optical disk, to substantially the same position (for example, see Patent Document 1). The optical path is shifted parallel by the change of the postures of the parallel flat plates, so that the light-emitting positions of the first and second laser elements seen from the optical disk may be adjusted to substantially the same position.

Meanwhile, recording and/or reproduction characteristics of the first laser light and the second laser light are optimized and the magnifications of the first laser light and the second laser light are changed by inserting/extracting the magnification conversion element to/from the composed optical path (for example, Patent Document 2).

Patent Document 1: JP-A-2003-085811
Patent Document 2: JP-A-2005-353250

Meanwhile, in the optical pickup device in the related art, the parallel flat plates are disposed between the optical path composition element and the first or second laser element and a space required for the change of the postures of the parallel flat plates is also needed. Accordingly, a gap between the first laser element and the optical path composition element or a gap between the second laser element and the optical path composition element needs to be sufficiently increased. For this reason, it has been difficult to make an optical system small. Further, since a space, which is required for the insertion and extraction of the magnification conversion element, is also needed, it has been more and more difficult to make an optical system small.

SUMMARY

The invention has been made to solve the problems in the related art, and an object of the invention is to provide an optical pickup device and an optical disk apparatus that can be reduced in size.

In order to solve the problems, according to an embodiment of the invention, there is provided an optical pickup device. The optical pickup device includes a first laser element that emits first laser light, a second laser element that emits second laser light of which the wavelength is longer than that of the first laser light, an optical path composition element that composes the first laser light and the second laser light to one optical path, a wavelength selective element that acts on the composed first or second laser light (through which the composed first or second laser light passes), and an objective lens that condenses the first laser light and the second laser light on an optical disk. The magnitude of the power of the wavelength selective element as a lens with respect to the second laser light is larger than the magnitude of the power of the wavelength selective element as a lens with respect to the first laser light. Accordingly, a desired object is achieved.

As described above, according to the embodiment of the invention, the optical pickup device includes a first laser element that emits first laser light, a second laser element that emits second laser light of which the wavelength is longer than that of the first laser light, an optical path composition element that composes the first laser light and the second laser light to one optical path, a wavelength selective element that acts on the composed first or second laser light (through which the composed first or second laser light passes), and an objective lens that condenses the first laser light and the second laser light on an optical disk. The magnitude of the power of the wavelength selective element as a lens with respect to the second laser light is larger than the magnitude of the power of the wavelength selective element as a lens with respect to the first laser light. Therefore, it may be possible to reduce the size of the optical pickup device.

That is, according to the invention, since the magnitude of the power of the wavelength selective element as a lens with respect to the second laser light is larger than the magnitude of the power of the wavelength selective element as a lens with respect to the first laser light, the change of an optical path, which is generated by the movement of the wavelength selective element, is different for the first laser light and the second laser light. For this reason, it may be possible to make the light-emitting positions of two kinds of laser light correspond to each other by the adjustment of the position of the wavelength selective element. Accordingly, a light-emitting position adjustment element and an adjustment mechanism therefor do not need to be provided between the optical path composition element 25 and the first and second laser elements, and it may be possible to make gaps between the optical path composition element and the first and second laser elements small. Further, a space, which is required for the insertion and extraction of a magnification conversion element, is not also needed. Accordingly, it may be possible to reduce the size of the optical pickup device.

DETAILED DESCRIPTION

An optical disk apparatus using an optical pickup device according to an embodiment of the invention will be described below with reference to accompanying drawings.

Figure 1:
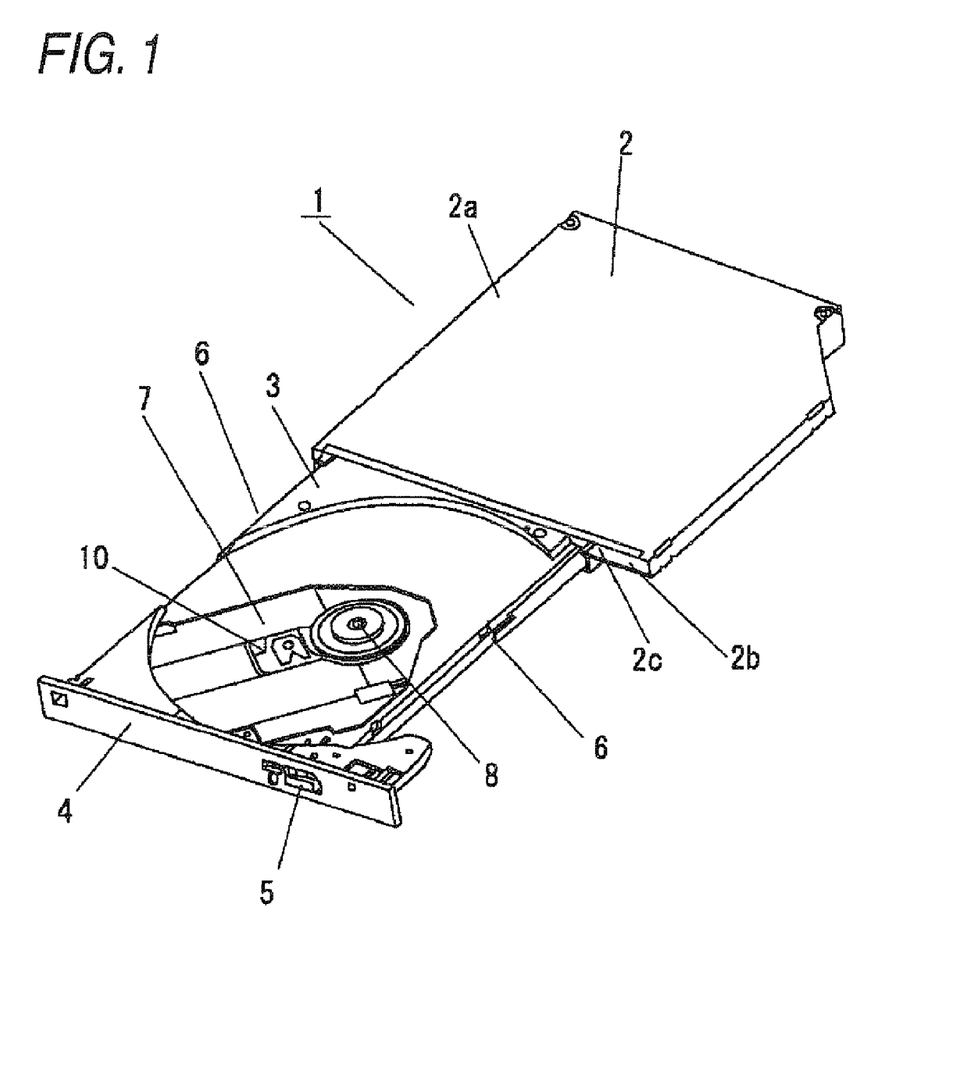
FIG. 1 is a view showing the structure of an optical disk apparatus according to an embodiment of the invention.

As shown in FIG. 1, a cover 2 of an optical disk apparatus 1 includes an upper cover 2a and a lower cover 2b, and the cover 2 has a pouched structure where an opening 2c is formed at one end portion of the cover. A tray 3 is held in the cover 2 so as to be freely inserted into and extracted from the opening 2c, and the tray 3 is made of a light material such as a resin material. A bezel 4 is provided at the front portion of the tray 3, and the bezel 4 closes the opening 2c when the tray 3 is received in the cover 2. The bezel 4 is provided with an eject button 5. If the eject button 5 is pressed, the tray 3 is slightly projected from the cover 2 through the opening 2c by a mechanism (not shown), so that the tray 3 can be inserted into and extracted from the cover 2.

Rails 6 are held on the lower cover 2b and engaged with both sides of the tray 3. The rails 6 are provided so as to slide with respect to the lower cover 2b and the tray 3 in a predetermined range in a direction where the tray 3 is inserted and extracted.

An optical pickup module 7 is mounted on the tray 3. The optical pickup module 7 includes a spindle motor 8 that rotationally drives an optical disk, and an optical pickup device 10 that is movably provided so as to approach and separate from the spindle motor 8.

The optical pickup device 10 is mounted on the optical disk apparatus 1. Since it may be possible to reduce the size of the optical pickup device 10 as described below, it may also be possible to reduce the size of the optical disk apparatus 1.

An optical system of the optical pickup device 10 will be described below.

Figure 2:
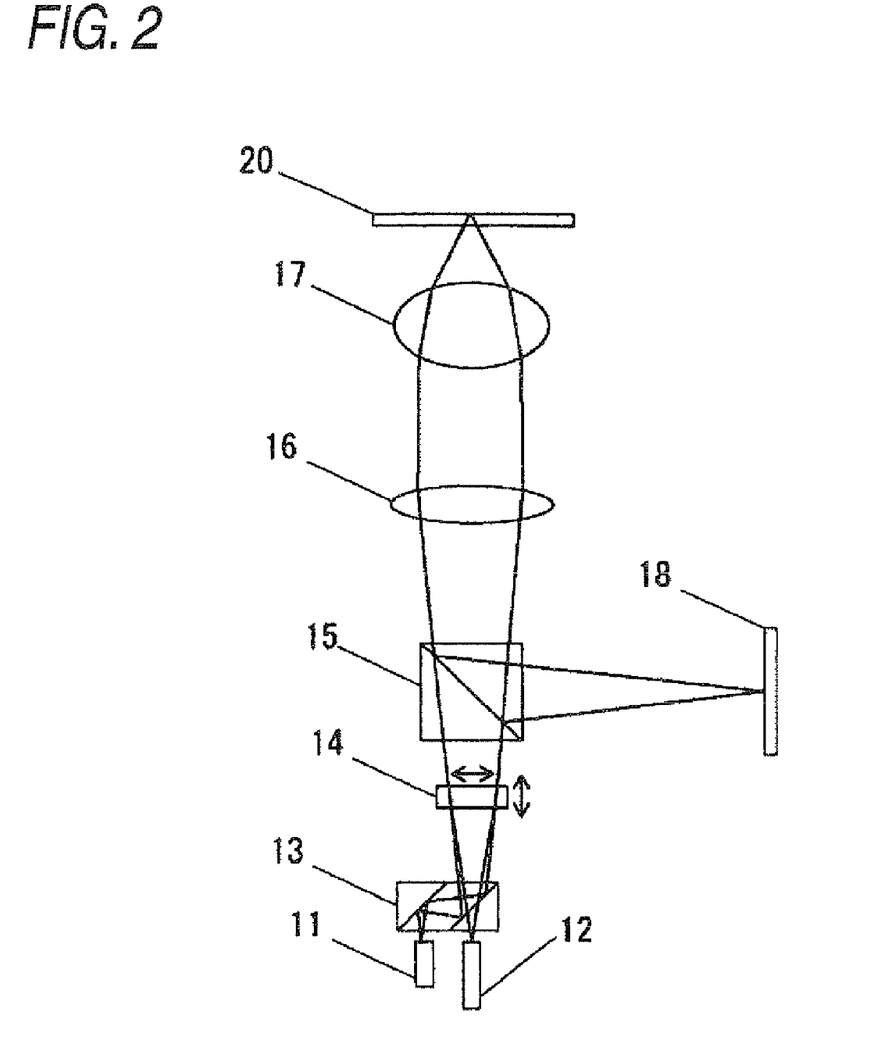
FIG. 2 is a view showing the structure of an optical system of an optical pickup device according to an embodiment of the invention.

As shown in FIG. 2, the optical pickup device 10 according to this embodiment includes a first laser element 11 that emits first laser light, a second laser element 12 that emits second laser light of which the wavelength is longer than that of the first laser light, an optical path composition element 13 that composes the first laser light and the second laser light to one optical path, a wavelength selective element 14 that acts on the composed first or second laser light (through which the composed first or second laser light passes), and an objective lens 17 that condenses the first laser light and the second laser light on an optical disk 20. Since the magnitude of the power of the wavelength selective element 14 of this embodiment as a lens with respect to the second laser light is larger than the magnitude of the power of the wavelength selective element as a lens with respect to the first laser light, it may be possible to reduce the size of the wavelength selective element.

That is, in this embodiment, the magnitude of the power of the wavelength selective element 14 as a lens with respect to the second laser light is larger than the magnitude of the power of the wavelength selective element as a lens with respect to the first laser light. Accordingly, the change of an optical path, which is generated by the movement of the wavelength selective element 14, is different for the first laser light and the second laser light. For this reason, it may be possible to make the light-emitting positions of two kinds of laser light correspond to each other by the adjustment of the position of the wavelength selective element. Accordingly, a light-emitting position adjustment element and an adjustment mechanism therefor do not need to be provided between the optical path composition element 13 and the first and second laser elements 11 and 12, and it may be possible to make gaps between the optical path composition element 13 and the first and second laser elements 11 and 12 small. Further, a space, which is required for the insertion and extraction of a magnification conversion element, is not also needed. Accordingly, it may be possible to reduce the size of the optical pickup device 10. That is, the wavelength selective element 14 acts on the composed first or second laser light (makes the composed first or second laser light pass therethrough), and serves as both a magnification conversion element and a light-emitting position adjustment element. The magnification conversion element makes a lateral magnification, which is toward the light-emitting position of the second laser light from an optical spot condensed on the optical disk 20, be lower than a lateral magnification that is toward the light-emitting position of the first laser light. The light-emitting position adjustment element adjusts the light-emitting position of the first laser light and the light-emitting position of the second laser light, which are seen from the optical disk 20, to substantially the same position.

This embodiment will be described in more detail.

As shown in FIG. 2, the first laser element 11 emits first laser light that is blue light having a first wavelength of about 405 nm for a Blu-Ray Disc (BD). The second laser element 12 emits second laser light that is red light having a second wavelength of about 650 nm (which is longer than the wavelength of the first laser light) for a DVD. The first and second laser elements 11 and 12 are disposed in one package, and form a laser module. The first laser light and the second laser light are emitted in substantially the same direction. The second laser element 12 also emits third laser light that is infrared light having a third wavelength of about 780 nm (which is longer than the wavelength of the second laser light) for a CD.

Figure 3:
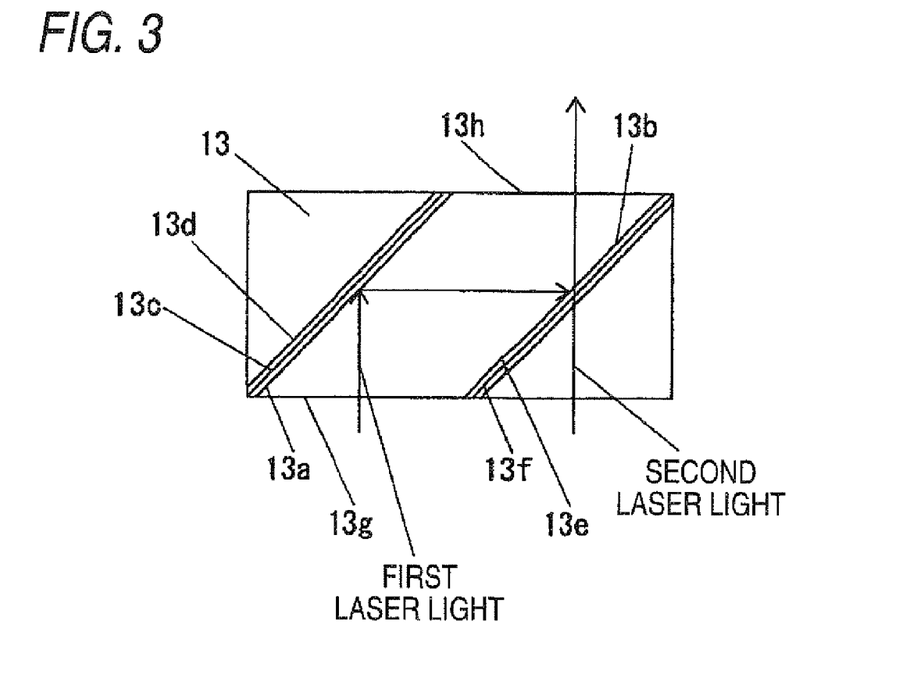
FIG. 3 is a view showing the structure of an optical path composition element of the embodiment of the invention.

The optical path composition element 13 is provided so as to face the first and second laser elements 11 and 12 as shown in FIG. 2. As shown in FIG. 3, the optical path composition element 13 includes three glass members that are joined to each other, and the boundaries between the respective glass members are first and second inclined surfaces 13a and 13b. The optical path composition element has a function to make the optical axes of the first laser light and the second laser light, which are emitted at predetermined intervals, substantially correspond to each other and a function to make the optical axes of the first laser light and the second laser light correspond to the optical axis of a collimator lens 16. The first inclined surface 13a is formed of a reflective layer 13c and an adhesive layer 13d that face the first laser element 11. The second inclined surface 13b is formed of a wavelength selective layer 13e and an adhesive layer 13f that face the first inclined surface 13a. The wavelength selective layer 13e has a function to reflect the first laser light (which is short-wavelength laser light, toward a beam splitter 15) and a function to transmit the second laser light (which is long-wavelength laser light) as it is. The reflective layer 13c is formed of a metal film or a laminated dielectric film. The wavelength selective layer 13e is formed of a laminated dielectric film. Further, the adhesive layers 13d and 13f are made of a resin material.

Furthermore, the first and second inclined surfaces 13a and 13b have an inclination angle of 45° with respect to an incident surface 13g where the first laser light and the second laser light enter. A gap between the first and second inclined surfaces 13a and 13b in a direction parallel to the incident surface 13g is set to be the same as a gap between the emission positions of the first laser light and the second laser light in the same direction as the direction parallel to the incident surface.

When entering the optical path composition element 13 from the incident surface 13g, the first laser light is reflected by the reflective layer 13c of the first inclined surface 13a and the wavelength selective layer 13e of the second inclined surface 13b and is emitted from a light emitting surface 13h. Accordingly, the first laser light does not pass through the adhesive layer 13d of the first inclined surface 13a and the adhesive layer 13f of the second inclined surface 13b. For this reason, even though the density of the first laser light at the first or second inclined surface 13a or 13b is high, the adhesive layers 13d and 13f made of a resin material do not deteriorate. That is, the first laser element 11 may be disposed close to the optical path composition element 13. Therefore, it may be possible to reduce the size of the optical pickup device 10.

Further, when entering the optical path composition element 13 from the incident surface 13g, the second laser light is transmitted through the second inclined surface 13b in the order of the adhesive layer 13f and the wavelength selective layer 13e, travels straight, and is emitted from the light emitting surface 13h. In this case, the second laser light emitted from the second laser element 12 passes through the adhesive layer 13f. However, since the wavelength of the second laser light is longer than that of the first laser light, the influence of the second laser light on the resin material may be ignored mostly.

Figure 4:
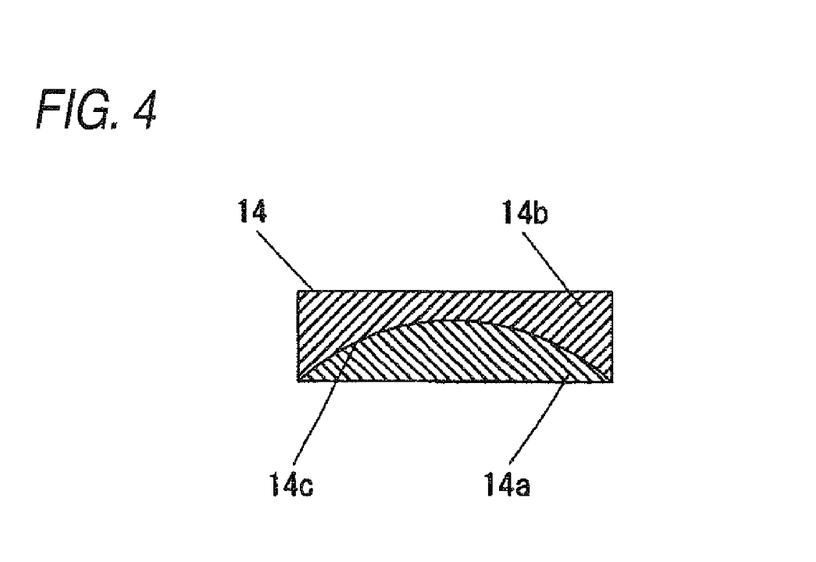
FIG. 4 is a view showing the structure of a wavelength selective element of the embodiment of the invention.

As shown in FIG. 4, the wavelength selective element 14 is formed of a lens including a second member 14b and a first member 14a of which a boundary surface 14c is formed in the shape of a lens. Here, a member facing the optical path composition element 13 is referred to as the first member 14a, and a member facing the optical disk 20 is referred to as the second member 14b. Materials of the first and second members 14a and 14b are transparent optical resins or optical glass. Dyes or pigments are added to the first or second member 14a or 14b so that a difference between the refractive indexes of the first and second members 14a and 14b of the wavelength selective element 14 in the first wavelength is different from a difference between the refractive indexes of the first and second members 14a and 14b of the wavelength selective element in the second wavelength. The boundary surface 14c is formed so that the surface of the first member 14a has a convex shape. It may be possible to form the wavelength selective element 14 using the above-mentioned simple structure and to manufacture the wavelength selective element at a low cost.

Figure 5:
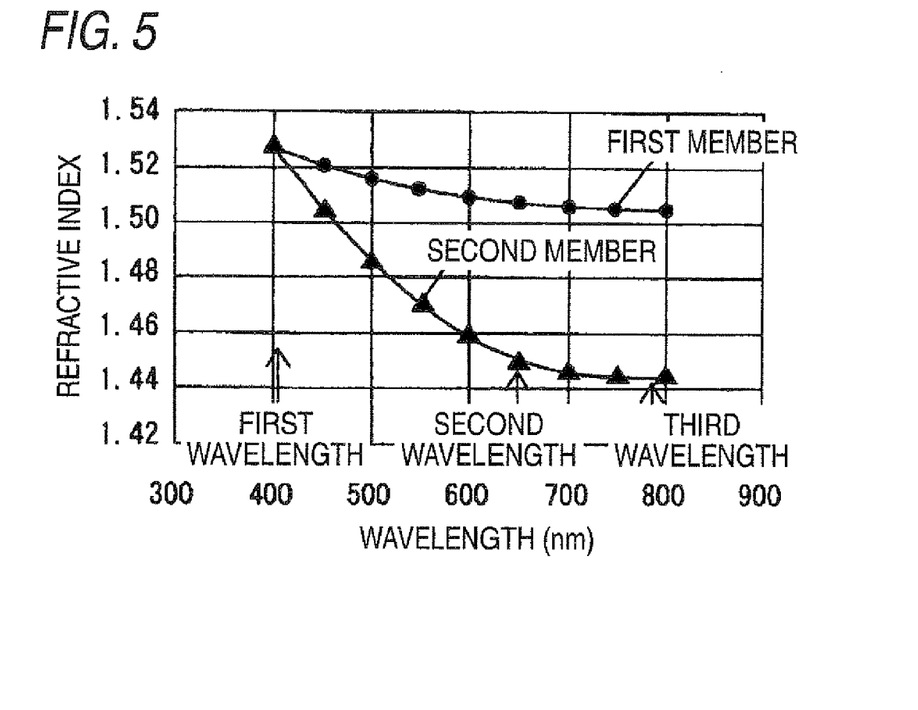
FIG. 5 is a view showing the wavelength dependency of a refractive index of the wavelength selective element of the embodiment of the invention.

If color materials, such as dyes or pigments, which absorb light in a certain wavelength band, are dispersed and dissolved in a transparent material, it may be possible to obtain an anomalous dispersion effect where the wavelength dependency of a refractive index of the transparent material is increased in a wavelength band near the certain wavelength and the refractive index of the transparent material is increased as shown in FIG. 5. In FIG. 5, color materials are added to the second member 14b. By the use of this property, it may be possible to make a difference between the refractive indexes of the first and second members 14a and 14b in the first wavelength be different from a difference between the refractive indexes of the first and second members 14a and 14b in the second wavelength. In FIG. 5, the refractive indexes of the first and second members 14a and 14b are equal to each other in the first wavelength and are different from each other in the second wavelength.

Since the refractive index of the first member 14a is equal to that of the second member 14b in the first wavelength, the first laser light is transmitted through the wavelength selective element 14 as it is. That is, the magnitude of the power of the wavelength selective element 14 as a lens with respect to the first laser light is substantially zero. Since the refractive index of the first member 14a is higher than that of the second member 14b in the second wavelength, the wavelength selective element 14 acts on the second laser light as a convex lens. That is, the magnitude of the power of the wavelength selective element 14 as a lens with respect to the second laser light is positive. Since a difference between the refractive indexes of the first and second members 14a and 14b in the third wavelength is also substantially equal to a difference between the refractive indexes of the first and second members in the second wavelength, the wavelength selective element 14 acts on the third laser light as a convex lens substantially like the case of the second laser light. That is, the wavelength selective element 14 acts on the second laser light as a convex lens but does not act on the first laser light as a lens. In other words, the magnitude of the power of the wavelength selective element 14 as a lens with respect to the second laser light is positive and the magnitude of the power of the wavelength selective element as a lens with respect to the first laser light is substantially zero. That is, the magnitude of the power of the wavelength selective element 14 of this embodiment as a lens with respect to the second laser light is larger than the magnitude of the power of the wavelength selective element as a lens with respect to the first laser light. For this reason, the wavelength selective element 14 is a magnification conversion element for making a lateral magnification, which is toward the light-emitting position of the second laser light from an optical spot condensed on the optical disk 20, be lower than a lateral magnification that is toward the light-emitting position of the first laser light. That is, since the second laser light is received more widely than the first laser light, it may be possible to improve the use efficiency of light. Meanwhile, since the distribution of the amount of the first laser light is in a range smaller than a range of the distribution of the amount of the second laser light, the first laser light has excellent recording/reproduction characteristics.

In FIG. 5, the refractive indexes of the first and second members 14a and 14b have been equal to each other in the first wavelength. However, the invention is not limited thereto. The refractive index of the first member 14a may be higher than that of the second member 14b in the first wavelength. In this case, the magnitude of the power of the wavelength selective element as a lens with respect to the first laser light is positive, but is smaller than the magnitude of the power of the wavelength selective element as a lens with respect to the second laser light. Further, the refractive index of the first member 14a may be lower than that of the second member 14b in the first wavelength. In this case, since being negative, the magnitude of the power of the wavelength selective element as a lens with respect to the first laser light is smaller than the magnitude of the power of the wavelength selective element as a lens with respect to the second laser light. In any event, the magnitude of the power of the wavelength selective element 14 as a lens with respect to the second laser light is larger than the magnitude of the power of the wavelength selective element as a lens with respect to the first laser light.

In FIG. 5, the wavelength selective element 14 has been formed so as to act on the second laser light as a convex lens without acting on the first laser light as a lens by forming the boundary surface 14c of the first member 14a in a convex shape and adding color materials to the second member 14b so that the refractive index of the first member 14a is equal to that of the second member 14b in the first wavelength and the refractive index of the first member 14a is higher than that of the second member 14b in the second wavelength. However, the invention is not limited to this combination, and may have various kinds of combination.

For example, the boundary surface 14c of the first member 14a may be formed in a concave shape, the same material may be used as base materials of the first and second members 14a and 14b, and color materials may be added to the first member 14a. In this case, the refractive index of the first member 14a is equal to that of the second member 14b in the second wavelength where the influence of an anomalous dispersion effect is small, and the refractive index of the first member 14a is higher than that of the second member 14b in the first wavelength. For this reason, the wavelength selective element 14 acts on the first laser light as a concave lens and does not act on the second laser light as a lens. That is, the magnitude of the power of the wavelength selective element 14 as a lens with respect to the second laser light is substantially zero and the magnitude of the power of the wavelength selective element as a lens with respect to the first laser light is negative. In other words, the magnitude of the power of the wavelength selective element 14 as a lens with respect to the second laser light is larger than the magnitude of the power of the wavelength selective element as a lens with respect to the first laser light. For this reason, even in this structure, the wavelength selective element 14 is a magnification conversion element for making a lateral magnification, which is toward the light-emitting position of the second laser light from an optical spot condensed on the optical disk 20, be lower than a lateral magnification that is toward the light-emitting position of the first laser light. In the case of this structure, since the materials of the first and second members 14a and 14b are common to each other, it may be possible to obtain an advantage of conveniently manufacturing and managing the magnification conversion element 14. Of course, the base material of the first member 14a may be different from that of the second member 14b, and the refractive index of the first member 14a may be different from that of the second member 14b in the second wavelength.

As shown in FIG. 2, the beam splitter 15 is disposed between the wavelength selective element 14 and the objective lens 17. The beam splitter 15 divides the first laser light emitted from the first laser element 11 and the second laser light emitted from the second laser element 12 into outgoing light that is directed to the optical disk 20 and return light that is reflected by the optical disk 20 and returns. The divided return light is directed to a light detector 18. The beam splitter 15 is a prism that has an inclined surface therein. The beam splitter divides outgoing and return optical paths by transmitting the outgoing light at the inclined surface as it is and reflecting the return light at the inclined surface.

The collimator lens 16 is disposed between the beam splitter 15 and the objective lens 17. The collimator lens 16 converts the outgoing light, which is emitted from the beam splitter 15, into substantially parallel light and makes the parallel light enter the objective lens 17. Further, the collimator lens conversely converts the return light of the parallel light, which is reflected from the objective lens 17, into converging light that is condensed on the light detector 18.

The objective lens 17 condenses the first laser light and the second laser light, which are emitted from the collimator lens 16, on the optical disk 20. Further, the first laser light and the second laser light, which are reflected from the optical disk 20, enter the objective lens, and are conversely converted into parallel light. Since the optical disk 20 includes a BD, a DVD, a CD, and the like, an optical path may be divided between the collimator lens 16 and the objective lens 17 and two objective lenses 17 including an optimized objective lens 17 for a BD and an optimized objective lens 17 for a DVD/CD may be disposed.

The light detector 18 detects return light returning from the beam splitter 15. The light detector 18 is provided with photodiodes that receive the first laser light, the second laser light, and the third laser light, respectively. Light entering the photodiode of the light detector 18 is converted into electric signals at the light detector 18. The electric signals are sent to the optical disk apparatus 1 and are used for the reproduction, focus servo, tracking servo, and the like of information that is recorded on the optical disk 20. The first laser light, the second laser light, and the third laser light enter the light detector 18 of this embodiment while being substantially condensed, respectively.

The optical paths of the first laser light and the second laser light will be described below. That is, as shown in FIG. 2, first laser light is emitted from the first laser element 11, passes through the optical path composition element 13, the wavelength selective element 14, the beam splitter 15, the collimator lens 16, and the objective lens 17, and converges on the optical disk 20. The first laser light is reflected by the optical disk 20, passes through the objective lens 17 and the collimator lens 16 as return light, and reaches the beam splitter 15. Further, the first laser light is divided by the beam splitter 15, enters the light detector 18, and is converted into electric signals. The converted electric signals are sent to the optical disk apparatus 1. Second laser light is emitted from the second laser light 12, passes through the optical path composition element 13, the wavelength selective element 14, the beam splitter 15, the collimator lens 16, and the objective lens 17, and converges on the optical disk 20. The second laser light is reflected by the optical disk 20, passes through the objective lens 17 and the collimator lens 16 as return light, and reaches the beam splitter 15. Further, the second laser light is divided by the beam splitter 15, enters the light detector 18, and is converted into electric signals. The converted electric signals are sent to the optical disk apparatus 1.

The operation of the wavelength selective element 14 as the light-emitting position adjustment element will be described below. As described above, the first laser light, the second laser light, and the third laser light enter the light detector 18 while being substantially condensed, respectively. The relative positions of the photodiodes, which receives the first laser light, the second laser light, and the third laser light, respectively, are fixed. Accordingly, if the relative positions of the first laser light, the second laser light, and the third laser light entering the photodiodes of the light detector 18 deviate from the relative positions of the photodiodes, there is generated light that does not accurately enter the photodiode. For this reason, there is a possibility that a problem is generated on the light in terms of the recording or reproduction characteristics. This is the same even though the relative light-condensing states of the first laser light, the second laser light, and the third laser light are changed. In order to prevent the above-mentioned trouble from being generated, the light-emitting position of each laser light seen from the optical disk 20 should be in a predetermined range.

In this embodiment, the second laser element 12 is formed by a semiconductor process. Accordingly, the accuracy of a gap between the light-emitting position of the second laser light and the light-emitting position of the third laser light is high and may be considered to be in a predetermined range. However, since the first and second laser elements 11 and 12 are mounted, it is considered that there is an error in a gap between the light-emitting position of the first laser light and the light-emitting position of the second laser light. Further, it is considered that there also is a certain error in a gap between the first and second inclined surfaces 13*a* and 13*b* of the optical path composition element 13. Accordingly, a gap between the first and second inclined surfaces 13*a* and 13*b* in a direction parallel to the incident surface 13*g* has been set to be the same as a gap between the emission positions of the first laser light and the second laser light in the same direction as the direction parallel to the incident surface. As a result, it is considered that the light-emitting position of the first laser light and the light-emitting position of the second laser light seen from the optical disk 20 may not be in a predetermined range. Accordingly, the wavelength selective element 14 as a light-emitting position adjustment element has been used in order to adjust the light-emitting position of the first laser light and the light-emitting position of the second laser light, which are seen from the optical disk 20, to substantially the same position.

In this embodiment, as described above, the magnitude of the power of the wavelength selective element 14 as a lens with respect to the second laser light has been set to be larger than the magnitude of the power of the wavelength selective element as a lens with respect to the first laser light. For example, the wavelength selective element 14 acts on the second laser light as a convex lens. When the wavelength selective element 14 is moved in an optical axis direction as shown in FIG. 2 in order to act as a convex lens, the light-emitting position of the second laser light seen from the optical disk 20 is moved in the optical axis direction. Further, when the wavelength selective element is moved in a direction orthogonal to the optical axis, the light-emitting position of the second laser light seen from the optical disk 20 is moved in a direction orthogonal to the optical axis. For this reason, it may be possible to adjust the light-emitting position of the second laser light, which is seen from the optical disk 20, by the position of the wavelength selective element 14.

The moving distance of the wavelength selective element 14 and the moving distance of the light-emitting position of the laser light, which is seen from the optical disk 20, are large as much as an absolute value of the power of the wavelength selective element as a lens with respect to the laser light is large. If the sign of power is changed into an opposite sign, the moving direction of the wavelength selective element is changed to an opposite direction. Accordingly, when the wavelength selective element 14 is moved, the moving distance of the light-emitting position of the first laser light seen from the optical disk 20 is different from that of the second laser light seen from the optical disk 20. For this reason, it may be possible to adjust the light-emitting position of the second laser light and the light-emitting position of the first laser light, which are seen from the optical disk 20, to substantially the same position by moving the wavelength selective element 14. Accordingly, the wavelength selective element 14 functions as a light-emitting position adjustment element.

Here, if the wavelength selective element 14 is formed so that the magnitude of the power of the wavelength selective element as a lens with respect to the first or second laser light is substantially zero, the light-emitting position of the first laser light seen from the optical disk 20 or the light-emitting position of the second laser light seen from the optical disk 20 is not moved substantially by the movement of the wavelength selective element 14. For this reason, when the light-emitting position is adjusted, only one light-emitting position is moved by the movement of the wavelength selective element 14. Accordingly, it is convenient to adjust the light-emitting position.

As described above, the optical pickup device 10 according to this embodiment includes the first laser element 11 that emits first laser light, the second laser element 12 that emits second laser light of which the wavelength is longer than that of the first laser light, the optical path composition element 13 that composes the first laser light and the second laser light to one optical path, the wavelength selective element 14 that acts on the composed first or second laser light, and the objective lens 17 that condenses the first laser light and the second laser light on the optical disk 20. Since the magnitude of the power of the wavelength selective element 14 as a lens with respect to the second laser light is larger than the magnitude of the power of the wavelength selective element as a lens with respect to the first laser light, it may be possible to reduce the size of the wavelength selective element.

That is, in this embodiment, the magnitude of the power of the wavelength selective element 14 as a lens with respect to the second laser light is larger than the magnitude of the power of the wavelength selective element as a lens with respect to the first laser light. Accordingly, the change of an optical path, which is generated by the movement of the wavelength selective element 14, is different for the first laser light and the second laser light. For this reason, it may be possible to make the light-emitting positions of two kinds of laser light correspond to each other by the adjustment of the position of the wavelength selective element. Accordingly, a light-emitting position adjustment element and an adjustment mechanism therefor do not need to be provided between the optical path composition element 13 and the first and second laser elements 11 and 12, and it may be possible to make gaps between the optical path composition element 13 and the first and second laser elements 11 and 12 small. Further, a space, which is required for the insertion and extraction of a magnification conversion element, is not also needed. Accordingly, it may be possible to reduce the size of the optical pickup device 10. That is, the wavelength selective element 14 acts on the composed first or second laser light, and serves as both a magnification conversion element and a light-emitting position adjustment element. The magnification conversion element makes a lateral magnification, which is toward the light-emitting position of the second laser light from an optical spot condensed on the optical disk 20, be lower than a lateral magnification that is toward the light-emitting position of the first laser light. The light-emitting position adjustment element adjusts the light-emitting position of the first laser light and the light-emitting position of the second laser light, which are from the optical disk 20, to substantially the same position.

Furthermore, in this embodiment, the optical pickup device 10 includes the beam splitter 15 and the light detector 18. The beam splitter divides the outgoing light that is directed to the optical disk 20 and return light that is reflected by the optical disk 20 and returns. The light detector detects the return light that returns from the beam splitter 15. The beam splitter 15 is disposed between the wavelength selective element 14 and the objective lens 17. For this reason, while the light-emitting position of the second laser light and the light-emitting position of the first laser light, which are seen from the optical disk 20, are adjusted to substantially the same position by the wavelength selective element 14, the outgoing light enters the optical disk 20 and the return light enters the light detector 18 in the adjustment state. Accordingly, the first laser light and the second laser light enter the light detector 18 at predetermined relative positions. If the beam splitter 15 is disposed between the optical path composition element 13 and the wavelength selective element 14, the outgoing light enters the optical disk 20 while the light-emitting positions are adjusted but the return light enters the light detector 18 while the light-emitting positions are not adjusted. Accordingly, this disposition is not appropriate, and it is preferable that the beam splitter 15 be disposed between the wavelength selective element 14 and the objective lens 17.

Moreover, in this embodiment, the optical pickup device 10 further includes the collimator lens 16. The collimator lens is disposed between the beam splitter 15 and the objective lens 17, converts the outgoing light into substantially parallel light, and makes the parallel light enter the objective lens 17. As described above, the collimator lens 16 converts the return light so that the return light is substantially condensed on the light detector 18. Accordingly, a lens, which condenses light on the light detector 18, does not need to be disposed between the beam splitter 15 and the light detector 18. As a result, it may be possible to further reduce the size of the optical pickup device 10.

Figure 6:
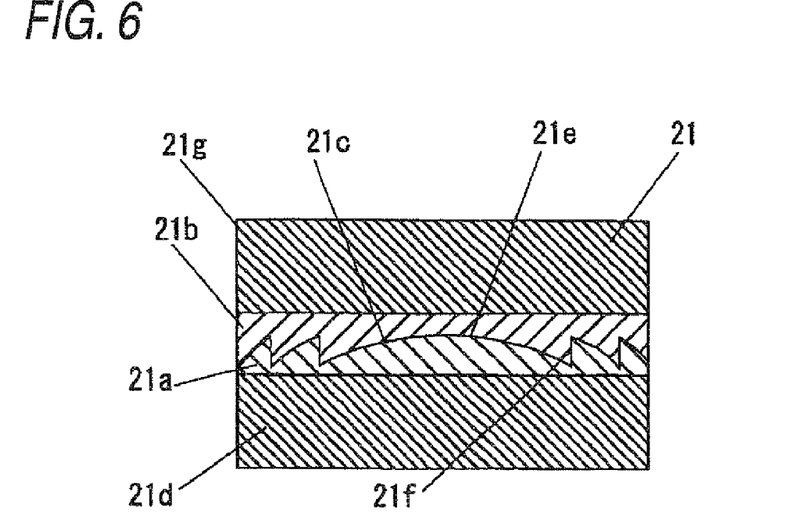
FIG. 6 is a view showing the structure of another example of the wavelength selective element of the embodiment of the invention.

An example where the wavelength selective element 14 is replaced by a wavelength selective element 21 shown in FIG. 6 in this embodiment will be described below. The wavelength selective element 21 is formed of a lens that includes a second member 21b and a first member 21a of which a boundary surface 21c is formed in the shape of a lens. The lens is formed by adding dyes or pigments to the first or second member 21a or 21b so that a difference between the refractive indexes of the first and second members 21a and 21b in the first wavelength is different from a difference between the refractive indexes of the first and second members 21a and 21b in the second wavelength. Further, as shown in FIG. 6, the boundary surface 21c is formed of a Fresnel surface. The Fresnel surface includes zonal portions 21e that are the surface of a lens, and stepped portions 21f that connect the adjacent zonal portions 21e.

When the boundary surface 21c is formed of a Fresnel surface, the wavelength selective element may be manufactured as follows:

First, an optical resin, which forms the first member 21a, is applied on a transparent substrate 21d by a spin coating method, is heated and held, and is then hardened. Subsequently, the optical resin is irradiated with ultraviolet light through a mask pattern so as to have a predetermined pattern and is developed so as to have a predetermined concavo-convex shape, thereby forming the first member 21a. For example, it may be possible to form the shape of a smooth zonal portion by a gray scale mask pattern. Then, concave portions of the portions having the concavo-convex shape are filled with an optical resin that forms the second member 21b, and a transparent substrate 21g is superimposed on the optical resin. In this case, since being interposed between the transparent substrates 21d and 21g, the thickness of a member including the combined first and second members 21a and 21b may be constant. Finally, the optical resin, which forms the second member 21b, is irradiated with ultraviolet light and is polymerized, thereby forming the second member 21b.

It is preferable that the depth of the stepped portion 21f be set so that an optical path length difference caused by the stepped portions 21f become nearly a natural number multiple of a wavelength, which makes the stepped portions act as a lens, of the first and second wavelengths. If the depth of the stepped portion is set as described above, interference caused by a phase difference is suppressed. Accordingly, the wavelength selective element 21 may emit the same light as light in the case of the shape of a general lens. For example, the refractive index of the first member 21a is set to be equal to the refractive index of the second member 21b in the first wavelength so that the first laser light is transmitted as it is. Further, the refractive index of the first member 21a is set to be different from the refractive index of the second member 21b in the second wavelength, and an optical path length difference caused by the stepped portion 21f is set to nearly a natural number multiple of the second wavelength.

Furthermore, when the wavelength selective element 21 acts on both the first laser light and the second laser light as a lens, an optical path difference caused by the stepped portion 21f is set to nearly a natural number multiple of the first and second wavelengths. If an optical path difference is set as described above, interference caused by a phase difference is suppressed for not only the first laser light but also second laser light. Accordingly, the wavelength selective element 21 may emit the same light as light in the case of the shape of a general lens.

The thickness of a lens-shaped portion of the wavelength selective element may be very small by an order where the depth of the stepped portion 21f is set to a natural number multiple of the wavelength, and the entire wavelength selective element 21 may be thin. As a result, it may be possible to further reduce the size of the optical pickup device 10.

Figure 7:
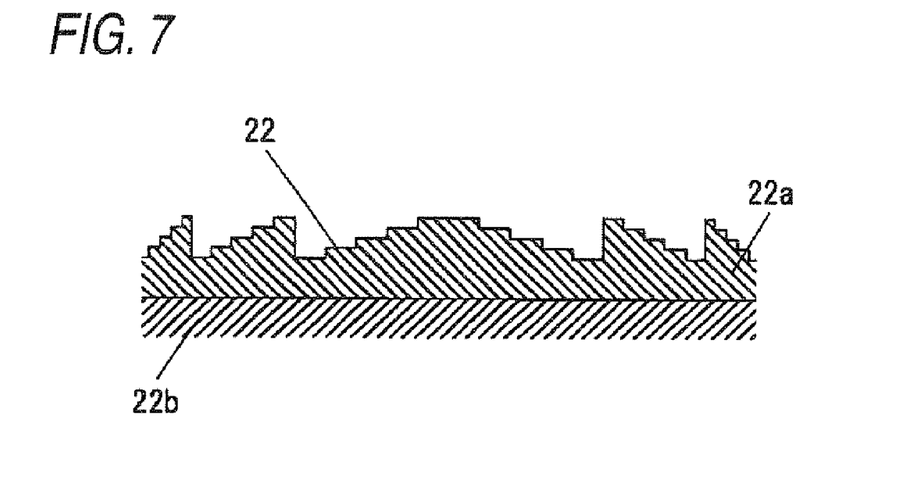
FIG. 7 is a view showing the structure of still another example of the wavelength selective element of the embodiment of the invention.

An example where the wavelength selective element 14 is replaced by a wavelength selective element 22 shown in FIG. 7 in this embodiment will be described below. In this example, the wavelength selective element 22 includes a diffraction lens 22a that includes a plurality of steps as shown in FIG. 7. In FIG. 7, the number of steps is four. Like in the case of the wavelength selective element 21, an optical resin hardened on a transparent substrate 22b is irradiated with ultraviolet light through a mask pattern and is developed so as to have a predetermined concavo-convex shape, thereby forming the diffraction lens 22a of the wavelength selective element 22.

In the diffraction lens 22a, an optical path length difference caused by all steps is equal to a natural number multiple of the wavelength of one of the first laser light and the second laser light, and an optical path length difference caused by one step is equal to a natural number multiple of the wavelength of the other thereof that is different from the natural number multiple of the wavelength of one of the first laser light and the second laser light. That is, the optical path length difference caused by one step is set to a natural number multiple of the first wavelength of the first laser light. Accordingly, the optical path length difference caused by all steps also becomes a natural number multiple of the first wavelength. Therefore, the first laser light passes through the diffraction lens 22a without diffraction as it is. Further, the optical path length difference caused by one step is different from a natural number multiple of the second wavelength of the second laser light, but the optical path length difference caused by all steps is set to a natural number multiple of the second wavelength of the second laser light. As a result, it may be possible to diffract light with the maximum efficiency. That is, the diffraction lens 22a may transmit the first laser light as it is, and may have wavelength selectivity that diffracts the second laser light with the maximum efficiency. Further, the wavelength selective element 22 makes the magnitude of the power of a lens with respect to the second laser light be positive. Since the magnitude of the power of the wavelength selective element as a lens with respect to the first laser light is substantially zero, the magnitude of the power of the wavelength selective element 21 as a lens with respect to the second laser light is larger than the magnitude of the power of the wavelength selective element as a lens with respect to the first laser light.

Like the wavelength selective element 21, the thickness of a lens-shaped portion of the wavelength selective element 22 may be very small and the entire wavelength selective element 22 may be thin. As a result, it may be possible to further reduce the size of the optical pickup device 10.

Figure 8:
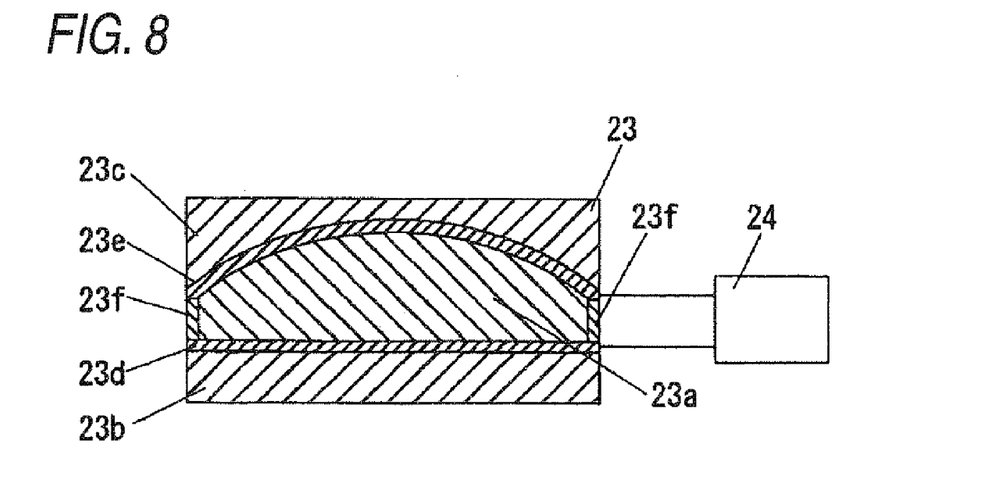
FIG. 8 is a view showing the structure of yet another example of the wavelength selective element of the embodiment of the invention.

An example where the wavelength selective element 14 is replaced by a wavelength selective element 23 shown in FIG. 8 in this embodiment will be described below. In this example, the wavelength selective element 23 is formed of a liquid crystal lens that changes a refractive index of liquid crystal 23a by changing the orientation of liquid crystal molecules through the change of a voltage applied according to incident laser light as shown in FIG. 8. The liquid crystal lens includes transparent electrodes 23d and 23e and liquid crystal 23a that are interposed between transparent substrates 23b and 23c. Insulating spacers 23f are provided between the transparent electrodes 23d and 23e, so that the two transparent electrodes 23d and 23e are insulated from each other. A drive power source 24 is connected to the transparent electrodes 23d and 23e. At least one surface of the surfaces of the transparent substrates 23b and 23c facing each other has the shape of a lens. In FIG. 8, the surface of the transparent substrate 23b facing the transparent substrate 23c is formed in the shape of a flat surface and the surface of the transparent substrate 23c facing the transparent substrate 23b is formed in the shape of a concave lens. Since the transparent electrodes 23d and 23e are films, a portion of the liquid crystal 23a facing the transparent electrode 23d is formed in the shape of a flat surface and a portion of the liquid crystal 23a facing the transparent electrode 23e is formed in the shape of a convex lens.

The orientation of liquid crystal molecules of the liquid crystal 23a is changed according to a voltage applied from the drive power source 24, so that the refractive index of the liquid crystal is changed. That is, since it may be possible to control a difference between the refractive index of the liquid crystal 23a and the refractive index of the transparent substrate 23c by an applied voltage, it may be possible to change the power of the wavelength selective element as a lens by an applied voltage. For example, if the refractive index of the liquid crystal 23a is set to be equal to the refractive index of the transparent substrate 23c by a certain applied voltage, light passes through the wavelength selective element as it is. If the refractive index of the liquid crystal 23a is set to be higher than the refractive index of the transparent substrate 23c by another applied voltage, light passing through the wavelength selective element is subject to an action of a convex lens. Accordingly, if the liquid crystal 23a is driven by a first applied voltage to have a predetermined power of the wavelength selective element as a lens with respect to the first laser light when the first laser light is emitted and the liquid crystal 23a is driven by a second applied voltage to have a larger power of the wavelength selective element as a lens with respect to the second laser light when the second laser light is emitted, the magnitude of the power of the wavelength selective element 23 as a lens with respect to the second laser light is larger than the magnitude of the power of the wavelength selective element as a lens with respect to the first laser light. As described above, the wavelength selective element 23 also has wavelength selectivity.

The wavelength selective element 23 may change the power thereof as a lens by an applied voltage. Accordingly, since it may be possible to finely adjust the light-emitting position in the optical axis direction after the completion of the assembly of the optical pickup device 10, it may be possible to obtain more excellent recording/reproduction characteristics.

Figure 9:
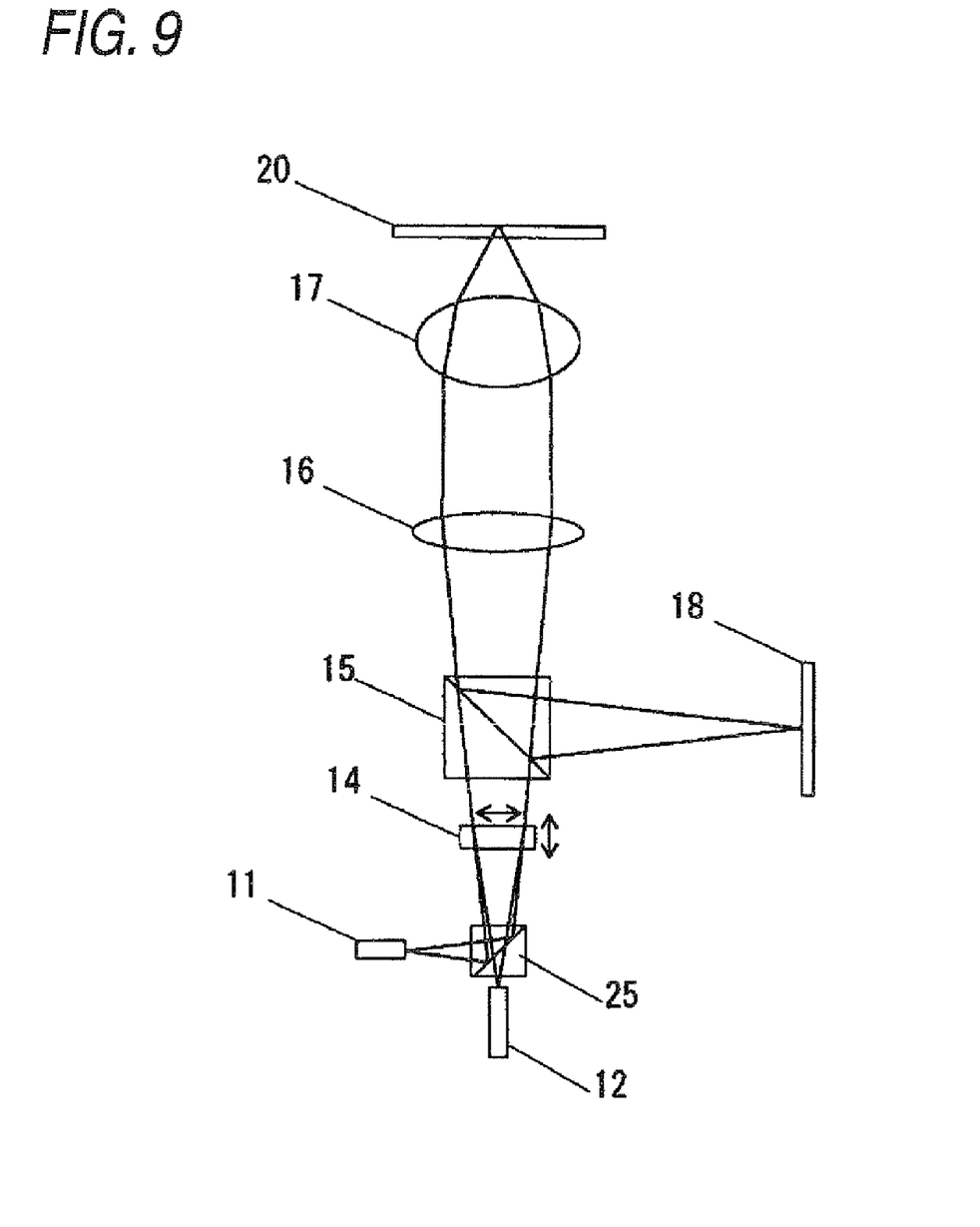
FIG. 9 is a view showing the structure of another example of the optical system of the optical pickup device according to the embodiment of the invention.

An example where the optical path composition element 13 is replaced by an optical path composition element 25 shown in FIG. 9 in this embodiment will be described below. In this example, the optical path composition element 25 includes two triangular prisms that are bonded to each other as shown in FIG. 9. The first and second laser elements 11 and 12 are disposed so as to face different triangular prisms. First laser light emitted from the first laser element 11 is reflected by a bonding surface of the prisms and is directed to the optical disk 20. Further, second laser light emitted from the second laser element 12 is transmitted through the bonding surface and is directed to the optical disk 20. A wavelength selective layer is provided on the side of the bonding surface facing the first laser element 11, and an adhesive layer is provided on the side of the bonding surface facing the second laser element 12. For this reason, the first laser light does not pass through the adhesive layer. Accordingly, even though the density of the first laser light is high, the adhesive layer made of a resin material does not deteriorate.

Even in the structure of the above-mentioned optical path composition element 25, the magnitude of the power of the wavelength selective element 14 as a lens with respect to the second laser light is larger than the magnitude of the power of the wavelength selective element as a lens with respect to the first laser light. For example, the wavelength selective element 14 acts on the second laser light as a convex lens. When the wavelength selective element 14 is moved in the optical axis direction as shown in FIG. 9 in order to act as a convex lens, the light-emitting position of the second laser light seen from the optical disk 20 is moved in the optical axis direction. Further, when the wavelength selective element is moved in a direction orthogonal to the optical axis, the light-emitting position of the second laser light seen from the optical disk 20 is moved in a direction orthogonal to the optical axis. Accordingly, it may be possible to adjust the light-emitting position of the second laser light, which is seen from the optical disk 20, by the position of the wavelength selective element 14.

The moving distance of the wavelength selective element 14 and the moving distance of the light-emitting position of the laser light, which is seen from the optical disk 20, are large as much as an absolute value of the power of the wavelength selective element as a lens with respect to the laser light is large. If the sign of power is changed into an opposite sign, the moving direction of the wavelength selective element is changed to an opposite direction. Accordingly, when the wavelength selective element 14 is moved, the moving distance of the light-emitting position of the first laser light seen from the optical disk 20 is different from that of the second laser light seen from the optical disk 20. For this reason, it may be possible to adjust the light-emitting position of the second laser light and the light-emitting position of the first laser light, which are seen from the optical disk 20, to substantially the same position by moving the wavelength selective element 14. Accordingly, even though the optical path composition element 25 is used, the wavelength is selective element 14 functions as a light-emitting position adjustment element.

That is, even when the optical path composition element 25 is used, the magnitude of the power of the wavelength selective element 14 as a lens with respect to the second laser light is larger than the magnitude of the power of the wavelength selective element as a lens with respect to the first laser light. Accordingly, the change of an optical path, which is generated by the movement of the wavelength selective element 14, is different for the first laser light and the second laser light. For this reason, it may be possible to make the light-emitting positions of two kinds of laser light correspond to each other by the adjustment of the position of the wavelength selective element. Accordingly, a light-emitting position adjustment element and an adjustment mechanism therefor do not need to be provided between the optical path composition element 25 and the first and second laser elements 11 and 12, and it may be possible to make gaps between the optical path composition element 25 and the first and second laser elements 11 and 12 small. Further, a space, which is required for the insertion and extraction of a magnification conversion element, is not also needed. Accordingly, it may be possible to reduce the size of the optical pickup device 10.

This application claims the benefit of Japanese Patent application No. 2009-060517 filed on Mar. 13, 2009, Japanese Patent application No. 2009-128473 filed on May 28, 2009, the entire contents of which are incorporated herein by reference.

What is claimed is:

1. An optical pickup device, comprising:
a first laser element that emits first laser light;
a second laser element that emits second laser light of which the wavelength is longer than that of the first laser light;
an optical path composition element that composes the first laser light and the second laser light to one optical path;
a wavelength selective element that acts on the composed first or second laser light through which the composed first or second laser light passes; and
an objective lens that condenses the first laser light and the second laser light on an optical disk, wherein:
the magnitude of the power of the wavelength selective element as a lens with respect to the second laser light is larger than the magnitude of the power of the wavelength selective element as a lens with respect to the first laser light, and
the wavelength selective element is formed of a lens that includes a second member and a first member of which a boundary surface is formed in the shape of a lens and is formed by adding dyes or pigments to the first or second member so that a difference between the refractive indexes of the first and second members in the first wavelength is different from a difference between the refractive indexes of the first and second members in the second wavelength.

2. The optical pickup device according to claim 1, wherein the magnitude of the power of the wavelength selective element as a lens with respect to the first or second laser light is substantially zero.

3. The optical pickup device according to claim 1, wherein the wavelength selective element makes a lateral magnification, which is toward the light-emitting position of the second laser light from an optical spot condensed on the optical disk, be lower than a lateral magnification that is toward the light-emitting position of the first laser light, and adjusts the light-emitting position of the first laser light and the light-emitting position of the second laser light, which are seen from the optical disk, to substantially the same position.

4. The optical pickup device according to claim 1, further comprising: a beam splitter that divides outgoing light directed to the optical disk and return light reflected by the optical disk and returning; and a light detector that detects the return light returning from the beam splitter, wherein the beam splitter is disposed between the wavelength selective element and the objective lens.

5. The optical pickup device according to claim 1, wherein the boundary surface is formed of a Fresnel surface.

6. The optical pickup device according to claim 5, wherein the Fresnel surface includes zonal portions that are the surface of a lens, and stepped portions that connect the adjacent zonal portions, and an optical path length difference caused by the stepped portions is nearly a natural number multiple of a wavelength, which makes the stepped portions act as a lens, of the first and second wavelengths.

7. The optical pickup device according to claim 1, wherein the wavelength selective element is formed of a diffraction lens that includes a plurality of steps and an optical path length difference caused by all the steps is equal to a natural number multiple of the wavelength of one of the first laser light and the second laser light, and an optical path length difference caused by one step is equal to a natural number multiple of the wavelength of the other thereof that is different from the natural number multiple of the wavelength of one of the first laser light and the second laser light.

8. The optical pickup device according to claim 1, wherein the wavelength selective element is formed of a liquid crystal lens that changes the refractive index of liquid crystal by changing the orientation of liquid crystal molecules through the change of a voltage applied according to incident laser light.

9. The optical pickup device according to claim 1, wherein the second laser element that emits third laser light of which the wavelength is longer than that of the second laser light.

10. An optical disk apparatus comprising:
a first laser element that emits first laser light;
a second laser element that emits second laser light of which the wavelength is longer than that of the first laser light;
an optical path composition element that composes the first laser light and the second laser light to one optical path;
a wavelength selective element that acts on the composed first or second laser light;
an objective lens that condenses the first laser light and the second laser light on an optical disk; and
a beam splitter that divides outgoing light and return light, the outgoing light being the first laser light and second laser light directed to the optical disk, and the return light being the outgoing light reflected by the optical disk and returning, wherein:
the magnitude of the power of the wavelength selective element as a lens with respect to the second laser light is larger than the magnitude of the power of the wavelength selective element as a lens with respect to the first laser light,
the optical path composition element is disposed so as to face the first and second laser elements and includes first and second surfaces that are parallel to each other therein,
the first laser light is reflected by the first and second inclined surfaces in this order, the second laser light is transmitted through the second inclined surface, and light-emitting positions of the first and second laser elements seen from the beam splitter are adjusted to substantially the same position,
a reflective layer and an adhesive layer are sequentially provided on the first inclined surface from the side of the first laser element, and
an adhesive layer and a wavelength selective layer are sequentially provided on the second inclined surface from the side of the second laser element.

* * * * *